US011956719B2

(12) United States Patent
Kochar et al.

(10) Patent No.: US 11,956,719 B2
(45) Date of Patent: Apr. 9, 2024

(54) LOW POWERED WIRELESS SENSOR NETWORK THAT OPTIMIZES ENERGY CONSUMPTION IN BATTERY OPERATED SENSOR NODES

(71) Applicant: BERT LABS PRIVATE LIMITED, Karnataka (IN)

(72) Inventors: Rohit Kochar, Bangalore (IN); Amit Bhanja, Bangalore (IN); Apurva Ankleshwaria, Bangalore (IN)

(73) Assignee: BERT LABS PRIVATE LIMITED, Bengaluru (IN)

( * ) Notice: Subject to any disclaimer, the term of this patent is extended or adjusted under 35 U.S.C. 154(b) by 0 days.

(21) Appl. No.: 16/829,904

(22) Filed: Mar. 25, 2020

(65) Prior Publication Data

US 2020/0314744 A1 Oct. 1, 2020

(30) Foreign Application Priority Data

Mar. 29, 2019 (IN) .............................. 201941012557

(51) Int. Cl.
*H04W 52/02* (2009.01)
*H04L 9/30* (2006.01)
*H04W 28/02* (2009.01)
*H04W 84/18* (2009.01)

(52) U.S. Cl.
CPC ... *H04W 52/0203* (2013.01); *H04W 28/0268* (2013.01); *H04L 9/30* (2013.01); *H04W 84/18* (2013.01)

(58) Field of Classification Search
None
See application file for complete search history.

(56) References Cited

U.S. PATENT DOCUMENTS

| 2005/0102443 | A1* | 5/2005 | Mahany | G06K 7/1098 |
| | | | | 710/18 |
| 2005/0111428 | A1* | 5/2005 | Orlik | H04L 45/121 |
| | | | | 370/344 |
| 2006/0227729 | A1* | 10/2006 | Budampati | H04L 67/12 |
| | | | | 370/278 |

(Continued)

FOREIGN PATENT DOCUMENTS

| JP | 2004302765 | * 10/2004 |
| JP | 2013120525 | * 6/2013 |
| JP | 2020036093 A | * 5/2018 |

*Primary Examiner* — Andre Tacdiran
(74) *Attorney, Agent, or Firm* — Maschoff Brennan (57) ABSTRACT

An energy-efficient wireless sensor network (WSN) is disclosed. The WSN comprises one or more base stations, a plurality of branch nodes communicatively coupled to each of the one or more base stations, and a plurality of leaf nodes communicatively coupled to each of the branch nodes. The WSN is configured for optimising energy consumption associated with each of the following: transmitting sensor data from the leaf node to the branch node; encryption of data transmitted between the leaf node and the branch node; updating firmware of the branch node or of the leaf node, through over-the-air updates from a remote server; sending data packets through the WSN based on a plurality of predefined levels of a Quality-of-Service (QoS); and configuring radio duty cycle protocols at the base station or the branch node or both during transmission and reception of data packets from the leaf nodes.

9 Claims, 6 Drawing Sheets (56) References Cited

U.S. PATENT DOCUMENTS

| | | | | |
|---|---|---|---|---|
| 2007/0242688 | A1* | 10/2007 | McFarland | H04L 12/2825 455/73 |
| 2012/0207062 | A1* | 8/2012 | Corbellini | H04W 74/08 370/256 |
| 2015/0061868 | A1* | 3/2015 | Kates | G06F 1/3209 340/539.22 |
| 2015/0245291 | A1* | 8/2015 | Lee | H04W 52/0229 370/311 |
| 2016/0212729 | A1* | 7/2016 | Bulten | H04W 52/0216 |
| 2016/0323839 | A1* | 11/2016 | Davis | H04L 41/12 |
| 2017/0195915 | A1* | 7/2017 | Zhang | H04W 28/06 |
| 2017/0359717 | A1* | 12/2017 | Adler | H04L 9/0891 |
| 2019/0109713 | A1* | 4/2019 | Clark | H04L 9/3239 |
| 2020/0068585 | A1* | 2/2020 | Yoshikawa | H04W 28/0278 |
| 2020/0136733 | A1* | 4/2020 | Hassan Hussein | H04W 52/46 |
| 2020/0143085 | A1* | 5/2020 | Cooner | G06F 21/64 |
| 2020/0296671 | A1* | 9/2020 | Bhattacharyya | H04W 4/38 |
| 2020/0298758 | A1* | 9/2020 | Ardalkar | A01M 29/18 |
| 2021/0075587 | A1* | 3/2021 | Alwen | H04L 9/0891 |

* cited by examiner

LOW POWERED WIRELESS SENSOR NETWORK THAT OPTIMIZES ENERGY CONSUMPTION IN BATTERY OPERATED SENSOR NODES

FIELD OF THE INVENTION

The present disclosure relates to wireless sensor networks. More particularly, the present disclosure relates to optimising energy consumption in a wireless sensor network.

BACKGROUND OF THE INVENTION

As known, a sensor network is a distributed network capable of sensing and analysing information related to changes in a physical environment in real-time. In particular, the sensor network allows for direct interfacing of sensors and actuators to a communication network. Hence, process data and diagnostic data obtained from the sensors may be communicated to any node in the sensor network. Further, the process data and the diagnostic data may also be communicated to a remote server or a local server for recording and analysis and machine learning.

Conventional hardwired sensor networks use cables for interfacing the sensors and actuators to the communication network. As a result, hardwired sensor networks are difficult to extend, especially when the sensors and the actuators are geographically spread out. Further, the installation cost of hardwired sensor networks is also high due to the costs associated with cabling, labour, material, and so on. Further, cables require connectors for interfacing the sensors and actuators to the communication network. At times, the connectors may become loose or misconnected, thus leading to malfunctioning of the hardwired sensor network. Furthermore, the use of a large number of hardwired sensors makes the sensor network complex and difficult to troubleshoot.

Presently, Wireless Sensor Networks (WSNs) are being widely used in place of hardwired sensor networks. The WSN typically consists of a plurality of leaf nodes (or sensor nodes), branch nodes and a base station. A leaf node comprises one or more sensors for measuring ambient conditions related to the environment around the leaf node. Further, the leaf node is equipped with data processing and communication capabilities for communicating wirelessly with branch nodes of the WSN. More specifically, a sensor node communicates with a branch node through a radio transceiver of the sensor node. Typically, the leaf nodes of a WSN are battery-powered. Therefore, the batteries have to be replaced periodically. Further, continuous or frequent operation of the radio transceiver of the leaf node for communicating with other nodes leads to increased energy consumption at the leaf nodes. The increased energy consumption calls for frequent replacement of the batteries. Therefore, there is a need to optimise the energy consumption at battery operated leaf nodes.

SUMMARY OF THE INVENTION

This summary introduces a selection of concepts in a simple manner that is further described in the detailed description of the disclosure. This summary is not intended to identify key or essential inventive concepts of the subject matter nor is it intended to determine the scope of the disclosure.

An example of a wireless sensor network (WSN) is disclosed. The WSN comprises one or more base stations, a plurality of branch nodes communicatively coupled to each of the one or more base stations, and a plurality of leaf nodes communicatively coupled to each of the branch nodes. The one or more base stations, the plurality of branch nodes and the plurality of leaf nodes are configured for optimising energy consumption associated with each of the following: transmitting sensor data from the leaf node to the branch node; encryption of data transmitted between the leaf node and the branch node; updating firmware of the branch node or of the leaf node through over-the-air updates from a remote server; sending data packets through the WSN based on a plurality of predefined levels of a Quality-of-Service (QoS); and configuring radio duty cycle protocols at the base station or the branch node or both during transmission and reception of data packets from the leaf nodes.

To clarify the advantages and features of the present disclosure further, a more particular description of the disclosure is rendered by reference to specific embodiments thereof, some of which are illustrated in the appended figures. It is to be appreciated that these figures depict only typical embodiments of the disclosure and are therefore not to be considered limiting of the scope of the disclosure. The disclosure is described and explained with additional specificity and detail in conjunction with the accompanying figures.

BRIEF DESCRIPTION OF FIGURES

The disclosure is described and explained with additional specificity and detail with the accompanying figures, in which.

Further, persons skilled in the art to which this disclosure belongs will appreciate that elements in the figures are illustrated for simplicity and are not necessarily drawn to scale.

Furthermore, in terms of the construction of the wireless sensor network, one or more components of the wireless sensor network may be represented in the figures by conventional symbols, and the figures may show only those specific details that are pertinent to understanding the embodiments of the present disclosure so as to not obscure the figures with details that are readily apparent to those of ordinary skill in the art having benefit of the description herein.

DETAILED DESCRIPTION

For the purpose of promoting an understanding of the principles of the present disclosure, reference will now be made to the embodiment illustrated in the figures and specific language will be used to describe the figures. Nevertheless, it must be understood that no limitation of the scope of the disclosure is thereby intended. Such alterations and further modifications to the disclosure, and such further applications of the principles of the disclosure, as described herein being contemplated, as would normally occur to one skilled in the art to which the disclosure relates to, are deemed to be a part of this disclosure.

It must be understood by those skilled in the art that the foregoing general description and the following detailed description are exemplary and explanatory of the present disclosure and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more devices or sub-systems or elements or structures or components preceded by "comprises . . . a" does not, without more constraints, preclude the existence of other devices, other sub-systems, other elements, other structures, other components, additional devices, additional sub-systems, additional elements, additional structures, or additional components. Appearances of the phrase "in an embodiment", "in another embodiment" and similar language throughout this specification may, but do not necessarily, all refer to the same embodiment.

In the present disclosure, relational terms such as first and second, and the like, may be used to distinguish one entity from the other, without necessarily implying any actual relationship or order between such entities.

Unless otherwise defined, all technical and scientific terms used herein have the same meaning as commonly understood by one of ordinary skill in the art to which this disclosure belongs. The systems, methods, and examples provided herein are illustrative only and not intended to be limiting.

The present disclosure relates to optimising energy consumption in a plurality of leaf nodes of a WSN. In one aspect of the present disclosure, the energy consumption associated with transmission of sensor data from the leaf node to the branch node is optimised. In another aspect, the energy consumption associated with encrypting of data transmitted between the leaf node and the branch node is optimised. In yet another aspect, the energy consumption associated with updating of firmware of the branch node or of the leaf node through over-the-air updates from a remote server is optimised. In yet another aspect, the energy consumption associated with sending data packets through the WSN, based on a plurality of predefined levels of a Quality-of-Service (QoS), is optimised. In yet another aspect, radio duty cycle protocols at the base station or the branch node or both are configured, during transmission and reception of data packets from the leaf node, for minimising retransmissions and associated energy losses.

Figure 1:
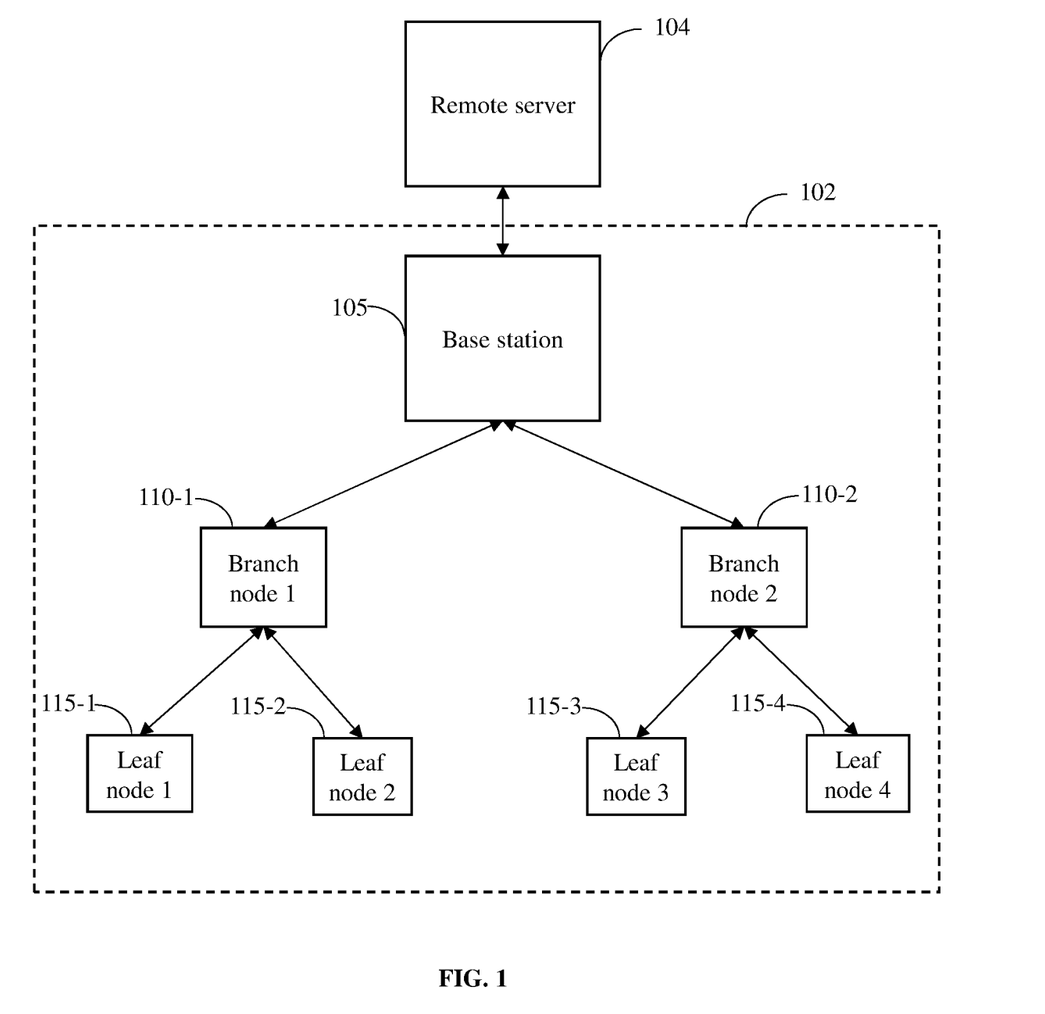
FIG. 1 illustrates a Wireless Sensor Network communicatively coupled to a remote server, in accordance with one embodiment of the present disclosure.

Referring to FIG. 1, a wireless sensor network (WSN) 102 communicatively coupled to a remote server 104 is shown, in accordance with one exemplary embodiment of the present disclosure. The WSN 102 is configured as a 6LowPAN network (IPv6 over Low-Power Wireless Personal Area Networks) for communicating with the remote server 104 over an IPv6 connection.

Further, the WSN 102 is also configured to have a tree topology. In the exemplary embodiment of FIG. 1, the base station 105 is communicatively coupled to a plurality of branch nodes 110-1 and 110-2, collectively referred as branch node 110. Although, the WSN 102 is shown to comprise a single base station 105, it must be understood that the WSN 102 may comprise more than one base station. The branch node 110-1 is further communicatively coupled to a plurality of leaf nodes 115-1 and 115-2, and the branch node 110-2 is further communicatively coupled to a plurality of leaf nodes 115-3 and 115-4. The branch node 110-1 serves as a cluster head for enabling the plurality of leaf nodes 115-1 and 115-2 to communicate with the base station 105. Similarly, the branch node 110-2 serves as a cluster head for enabling the plurality of leaf nodes 115-3 and 115-4 to communicate with the base station 105. Henceforth, in the present disclosure, the term 'node' may be used to refer to either one of a 'branch node' or 'leaf node' or both, wherever suitable.

The leaf node 115 is a sensor and/or monitoring node consisting of a microprocessor (not shown) and one or more sensors (not shown). The microprocessor collects information from the one or more sensors. The one or more sensors are used for measuring or detecting one or more parameters pertaining to a HVAC system. More specifically, the parameter is associated with a physical environment in which the WSN 102 is present. Non-limiting examples of sensors in a HVAC system include temperature sensors, humidity sensors, motion sensors, pressure sensors, load sensors, air quality sensors, carbon dioxide sensors, smoke detectors, energy meters and monitoring device to capture operational parameters of equipment in HVAC System. The microprocessor further analyses the information from the one or more sensors and communicates the information to other nodes in the WSN 102. In one example, the microprocessor may compare a first value received from a sensor against a previously stored second value to determine whether the first value has to be transmitted to the branch node 110 or not.

A leaf node 115 communicates with other nodes in the WSN 102 using a radio transceiver (not shown). The radio transceiver, the microprocessor and the one or more sensors of the leaf node 115 are powered using one or more batteries. For example, the battery may be one of an alkaline battery, a lithium ion battery and a Nickel-Cadmium battery.

In one aspect of the present disclosure, an active period of the radio transceiver of the leaf node 115 is reduced, in order to optimise overall energy consumption in the WSN 102. The active period of the radio transceiver refers to a duration for which the radio transceiver is switched ON for transmitting or receiving data packets from other nodes in the WSN 102. When the radio transceiver is switched OFF, the leaf node goes into a sleep mode. Further, the leaf node 115 is restored into active mode from sleep mode, when certain predefined conditions are met, as would be clear from the following description.

Figure 2:
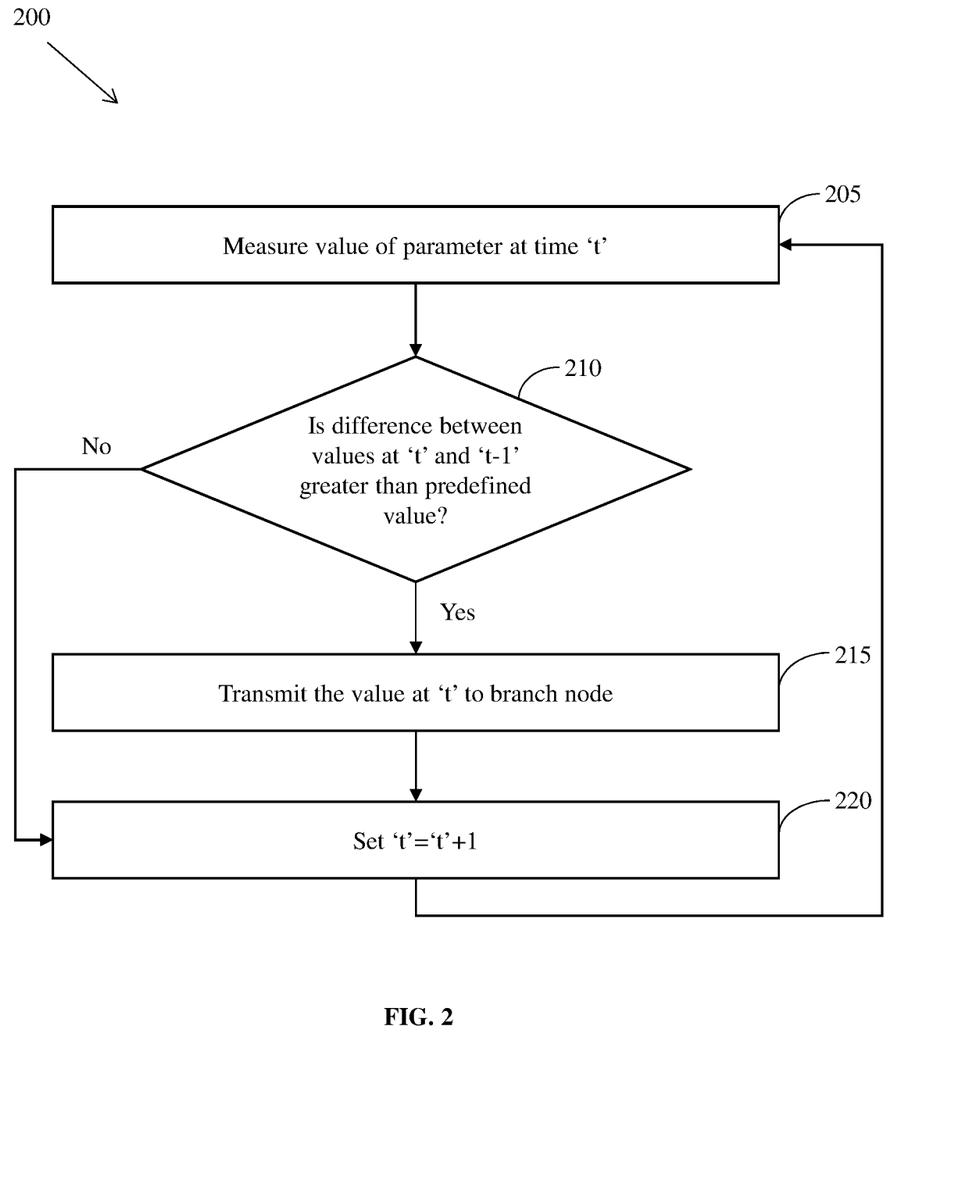
FIG. 2 shows a method of optimising energy consumed during transmission of sensor data, in accordance with one embodiment of the present disclosure.

Referring to FIG. 2, in conjunction with FIG. 1, a method 200 of optimising energy consumed during transmission of sensor data is described, assuming that the leaf node 115-1 is transmitting the sensor data to the branch node 110-1. The sensor data is a value of a parameter measured by the one or more sensors of the leaf node 115-1. Non-limiting examples of the parameter may include, but is not limited to, temperature, humidity, carbon dioxide levels, and pressure.

At step 205, the one or more sensors of the leaf node 115-1 measures a value of the parameter at time 't'. The one or more sensors measure the parameter at a predefined periodicity. For example, the predefined periodicity may be one minute.

At step 210, the leaf node 115-1 compares the measured value of the parameter (that is, the sensor data) against a value measured in a previous instant. In the present example, since the predefined periodicity is one minute, the value measured at time 't' minutes may be compared with a value measured at time 't'−1 minutes. If the difference between the values at T minutes and 't'−1 minutes is greater than a predefined value, step 215 is performed. Otherwise, step 220 is performed.

At step 215, the leaf node 115-1 transmits the measured value to the branch node 110-1.

At step 220, the time 't' is set to 't'='t'+1. Further step 205 is repeated.

As may be understood, in the method 200, the leaf node 115-1 sends a current sensor data to the branch node 110-1 only when the difference between the current sensor data and an immediate previous transmitted sensor data is greater than a predefined value. In another implementation, however, the sensor data may be sent to the branch node 110-1 periodically, irrespective of the value. For example, the leaf node 115-1 may send every fifth value measured to the branch node 110-1. The branch node 110-1 may retransmit the sensor data received, to the base station 105. The base station 105 may further send the sensor data to the remote server 104 for storage or analysis or both.

Figure 3:
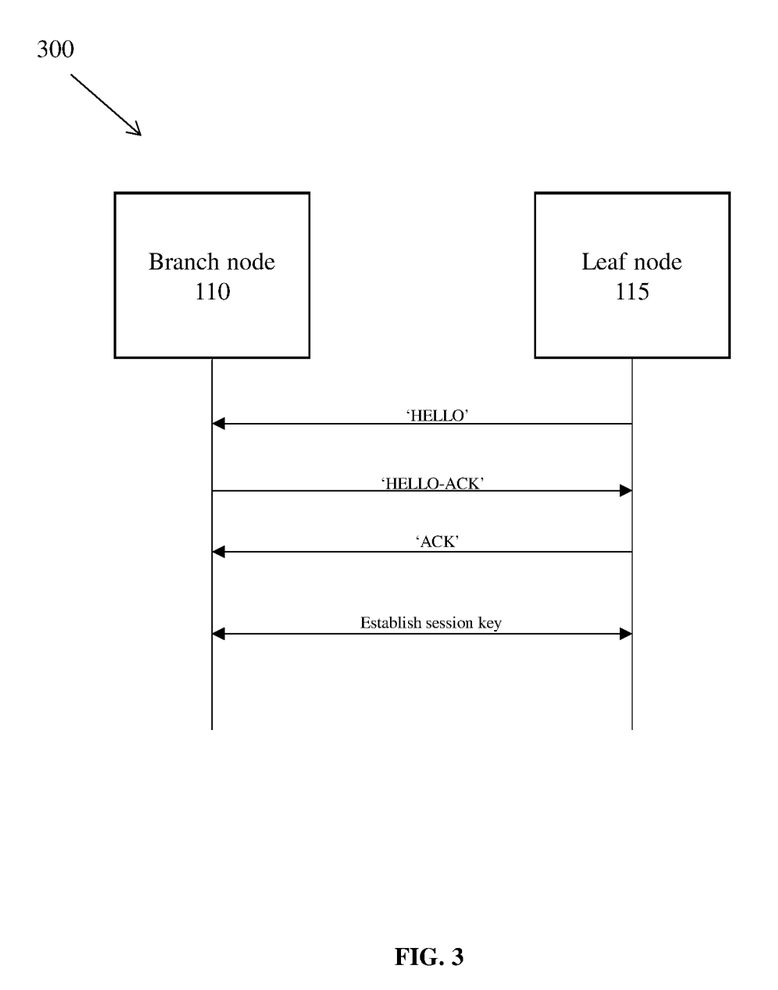
FIG. 3 shows a method of securing communication between nodes in the Wireless Sensor Network, in accordance with one embodiment of the present disclosure.

Referring to FIG. 3, in conjunction with FIG. 1, a method 300 of securing communication between nodes in the WSN 102 in an energy-efficient manner is described, assuming that the communication takes place between the leaf node 115-1 and the branch node 110-1. However, it must be understood that the method 300 may be implemented for securing communication between any two communicatively coupled nodes in the WSN 102.

In the present disclosure, the communication between two nodes is secured by establishing a session key after a three-way handshake protocol. At first, the leaf node 115-1 transmits a 'HELLO' message to the branch node 110-1. The HELLO message comprises a first key K1 encrypted using a shared key. The shared key is a key previously stored on both the branch node 110-1 and the leaf node 115-1. In one implementation, the leaf node 115-1 transmits the 'HELLO' message every 5 minutes. The 'HELLO' message acts as a probe packet for determining whether the branch node 110-1 is ready to receive further data or not. Consequently, the three-way handshake protocol helps in avoiding energy losses from lost data packets, by ensuring that the branch node 110-1 is ready for receiving large volumes of data.

Upon receiving the HELLO message, the branch node 110-1 generates a random second key K2. Further, the branch node 110-1 generates a third key K3 using the first key K1, the second key K2 and the shared key. Further, the branch node 110-1 sends a HELLO-ACK message comprising the second key K2 in unencrypted form and a fourth key K4 generated during initialization. The fourth key K4 is encrypted using the third key K3.

Upon receiving the HELLO-ACK message, the leaf node 115-1 uses the second key K2, the first key K1 and the shared key to generate a fifth key K5. The value of the fifth key K5 is the same as the value of the third key K3. Therefore, the leaf node 115-1 decrypts the fourth key K4 received from the branch node 110-1 using the fifth key K5.

The leaf node 115-1 further responds to the 'HELLO-ACK' message by sending an 'ACK' message to the branch node 110-1. Upon receiving the 'ACK' message, the branch node 110-1 ends the three-way handshake procedure. Further, the branch node 110-1 and the leaf node 115-1 use the fourth key K4 as the session key for exchanging data packets. More specifically, the branch node 110-1 uses the session key for encrypting data packets to be sent to the leaf node 115-1 and the leaf node 115-1 uses the session key for encrypting data packets to be sent to the branch node 110-1. The WSN 102 disclosed herein avoids using computation-intensive algorithms such as Diffie-Hellman key for generating the session keys, so as to reduce energy consumption associated with encryption. In one implementation, the session key is established using a pseudo-random number generator. The pseudo-random number generator is cryptographically secured.

The session key is a symmetric key used for encryption and decryption of data transmitted between the leaf node 115-1 and the branch node 110-1. Further, the session key also helps in preventing replay attacks and in avoiding reuse of cryptographic nonces during communication between two nodes in the WSN 102. It must be understood that every pair of nodes in the WSN 102 uses a different session key. Consequently, each node in the WSN 102 may store one or more session keys for communicating with one or more other nodes in the WSN 102. Each of the one or more session keys, however, expire after a predefined expiry time.

In order to check for expiry of the session key, the leaf node 115-1 sends an UPDATE message to the branch node 110-1 periodically. If the branch node 110-1 responds to an UPDATE message with an UPDATE-ACK message, the leaf node 110-1 determines that the session key is updated. Otherwise, if the branch node 110-1 does not respond to the UPDATE message with an UPDATE-ACK message, the leaf node 115-1 checks if the predefined expiry time of branch node 110-1 has lapsed. If the predefined expiry time has lapsed, then the leaf node 115-1 determines that the branch node 110-1 has rebooted and that the session key has changed. Consequently, the leaf node 115-1 establishes the session key again.

Figure 4:
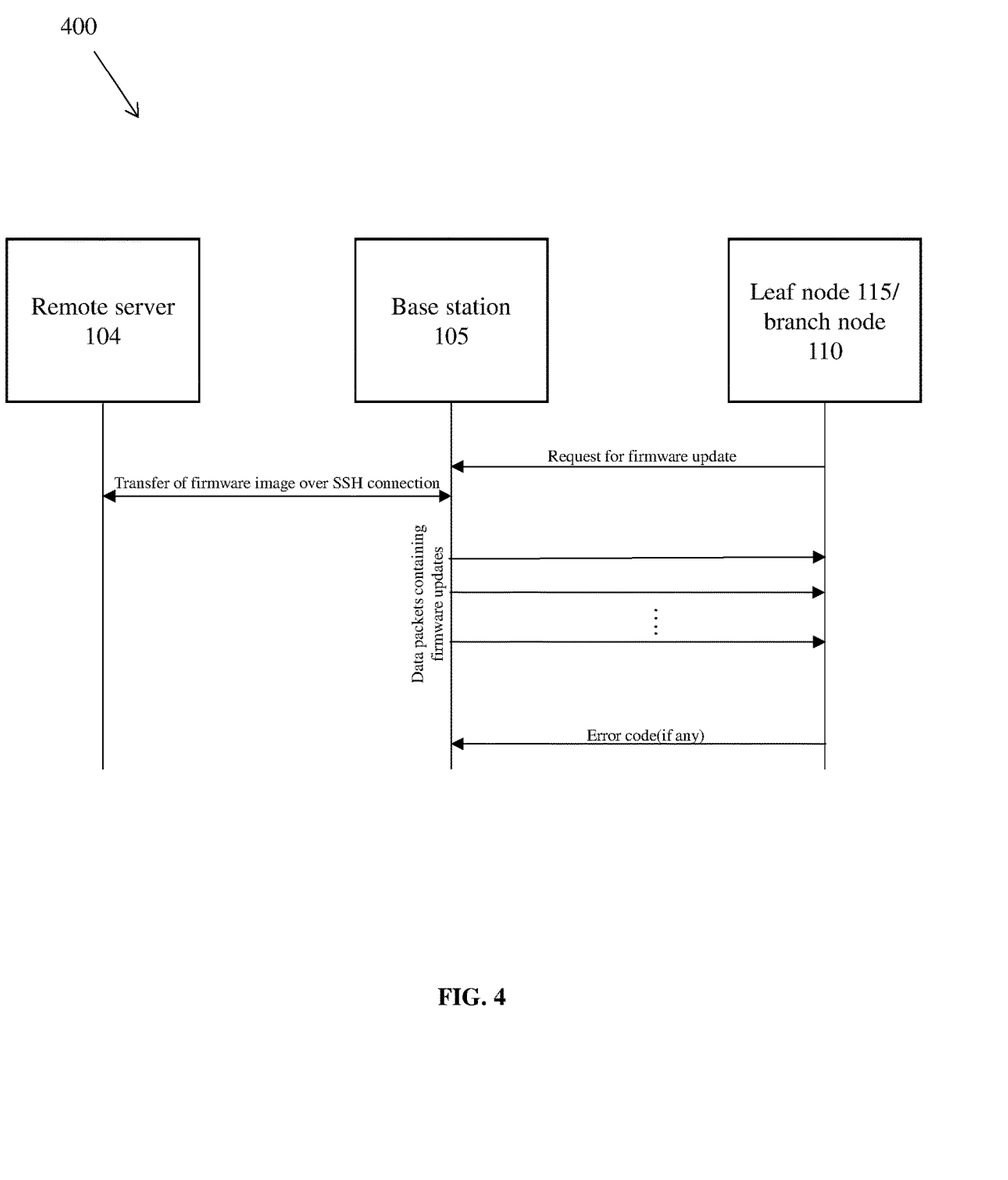
FIG. 4 shows a method of updating firmware of the nodes in the Wireless Sensor Network, in accordance with one embodiment of the present disclosure.

Referring to FIG. 4, in conjunction with FIG. 1, a method 400 of updating firmware of the nodes in the WSN 102, in an energy-efficient manner is described. The firmware is updated using Over-The-Air (OTA) updates received from the remote server 104.

At first, the node (the leaf node 115 or the branch node 110) sends a request for firmware updates to the base station 105. In one implementation, the node may send the request for firmware updates periodically, for example, once in every 24 hours. The request comprises an identity of the node. The base station 105 further retransmits the request to the remote server 104.

Upon receiving the request from the base station 105, the remote server 104 responds to the request by sending a firmware image to the base station 105 over a Secure Shell (SSH) connection, as data packets. In one implementation, each of the data packets comprises a start byte, an end byte and 256 bytes of payload. The term 'payload' refers to data related to the firmware image. If no firmware update is available for the node, then the start byte and the end byte of the data packet are set to zero.

The base station 105 simultaneously transmits the data packets received from the remote server 104, to the node. The base station 105 sends the data packets over predefined intervals of time, say, at intervals of 5 seconds. For example, the base station 105 may transmit a first data packet at time 't' seconds, a second data packet at time 't'+5 seconds, a third data packet at time 't'+10 seconds and so on. Upon receiving the data packets, the node reconstructs the firmware image using the payload in each of the data packets. During reconstruction of the firmware image, the node may or may not encounter one or more errors. Based on the error encountered, the node transmits an error code to the base station 105.

The firmware image received at the node comprises a metadata header and a firmware application. The metadata header comprises a Cyclic Redundancy Check (CRC) code, a CRC shadow, a size of the firmware application, a Universally Unique Identifier (UUID) and a version of the firmware application. The CRC code is calculated by the remote server 104 at the time of preparation of the firmware image. The CRC shadow is calculated at the node after receiving the firmware image. The node further compares the CRC shadow calculated with the CRC code in the metadata header to determine whether the download of firmware image from the remote server 104 was successful or not. More specifically, if the CRC shadow does not match with the CRC code, the download is considered to be unsuccessful. Otherwise, the download is considered to be successful.

In one example, the error may be related to missing data packets. For example, if there are three data packets out of which the second data packet is missing, the missing data packet may be identified by comparing the end byte of the first data packet with the start byte of the third data packet. For example, the error code for a missing data packet may be '0'. The node transmits the error code along with the start byte of the missing data packet to the base station 105. The base station 105 further transmits the firmware image as data packets, starting from the position indicated to the node.

In another example, the error may be related to absence of updates. As already mentioned, the remote server 104 indicates the absence of updates to the node, by sending a data packet having the start byte and the end byte set to zero. Upon receiving the data packet with the start byte and the end byte set to zero, the node waits until the predefined time period lapses, for sending the next request for firmware update. In the present example, the predefined time period is 24 hours.

In yet another example, the error may be related to a version of the firmware. For example, the node may determine that the version of the firmware indicated in the firmware image is old compared to a version of the firmware currently installed on the node. Upon detecting that the version of the firmware is old, the node transmits an error code to the base station 105. In one example, the error code for wrong version of firmware may be '1'. In response to receiving the error code from the node, the base station 105 stops sending further data packets to the node.

After the base station 105 completes transfer of the firmware image to the node, a bootloader flashes the firmware image into a flash memory of the node, upon booting of the node. More specifically, the bootloader executes the firmware application in the firmware image, in order to install the new version of firmware on the node. If the transfer of the firmware image from the base station 105 to the node is interrupted, the bootloader erases an OTA slot in the external flash drive of the node. Otherwise, if the transfer is successful, the node calculates a CRC shadow of the firmware image received from the base station 105. Further, the CRC shadow calculated is compared with the CRC code in the metadata header of the firmware image. If the CRC shadow calculated does not match with the CRC code, the node erases the firmware image from the external flash drive. Otherwise, if the CRC shadow matches with the CRC code, the node compares the version of the firmware image received from the base station 105 with the version of a firmware image currently installed on the node. If the version of the received firmware image is higher than that of the firmware image currently installed, the firmware application is installed on the node. Otherwise, the received firmware image is not installed on the node.

Figure 5:
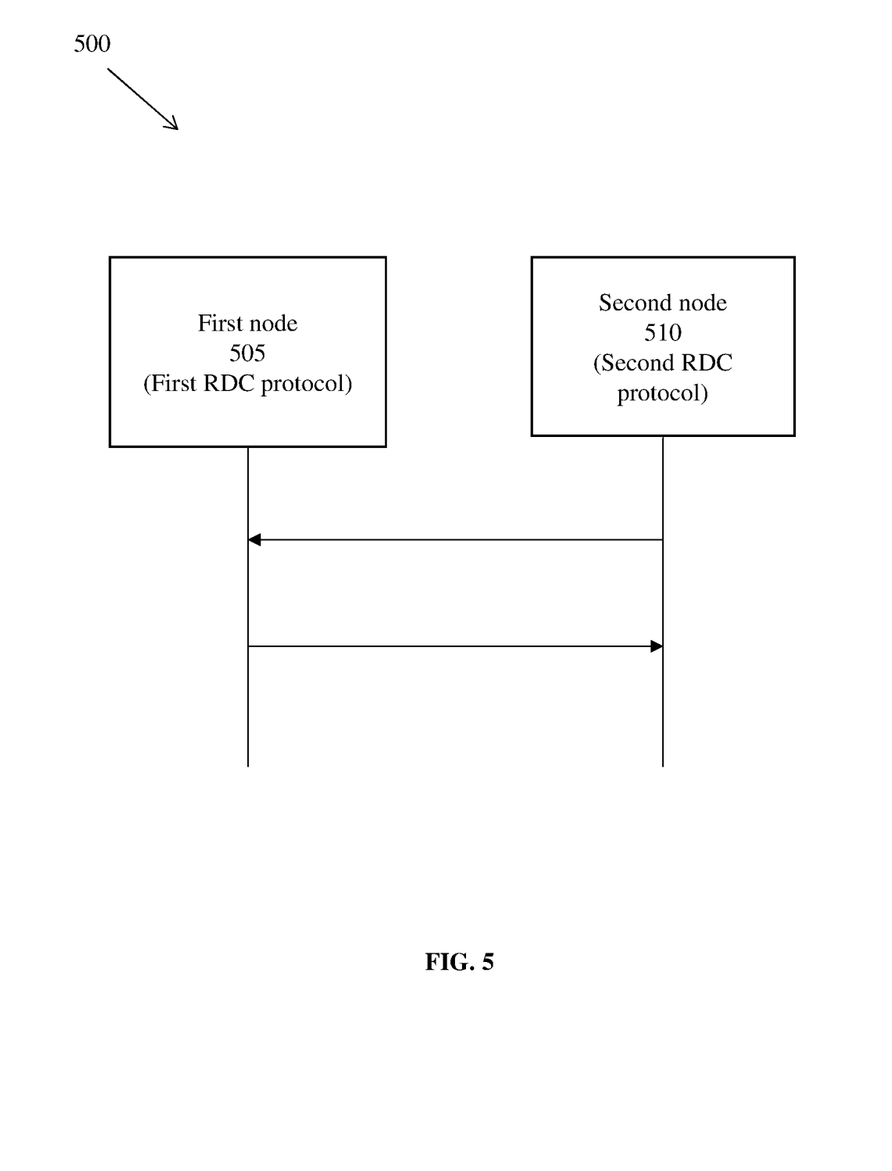
FIG. 5 shows a method of configuring radio duty cycles at a first node of the Wireless Sensor Network, communicatively coupled to a second node of the Wireless Sensor Network, in accordance with one embodiment of the present disclosure.

Referring to FIG. 5, in conjunction with FIG. 1, a method 500 of configuring radio duty cycles at a first node 505 communicatively coupled to a second node 510 is described. Here, the term 'first node' may refer to a branch node, a base station or a router of the WSN 102 and the term 'second node' refers to a leaf node of the WSN 102.

The first node 505 is configured to use a first radio duty cycling (RDC) protocol and the second node 510 is configured to use a second RDC protocol. In one example, the first RDC protocol is a null RDC protocol and the second RDC protocol is a contikimac RDC protocol.

The first RDC protocol configures a radio transceiver of the first node 505 to be ON throughout. Further, the first RDC protocol may configure the first node 505 to send data packets to the second node 510, until a link layer acknowledgement is received from the second node 510.

The second RDC protocol configures a radio transceiver of the second node 510 to wake up periodically for listening to a neighbouring node. In the present embodiment, the first node 505 is the neighbouring node for the second node 510. During the wake-up period, if the second node 510 detects transmission of a data packet from the first node 505, the radio transceiver of the second node 510 is kept ON in order to receive the data packet. Further, the first node 505 may retransmit the data packet until a link layer acknowledgement is received from the second node 510. The second RDC protocol configures the node to have predefined values for a plurality of performance parameters. The plurality of performance parameters may include, but are not limited to, a time interval between transmissions of data packets, a time interval between receiving a data packet and sending an acknowledgment for the data packet, and a time period required for successfully detecting an acknowledgment from the neighbouring node.

The first node 505 receives one or more data packets from the second node 510 by switching ON the radio transceiver of the first node 505 upon detecting transmittal of the one or more data packets from the second node 510. Further, the radio transceiver of the first node 505 remains ON until the reception of the one or more data packets from the second node 510 is completed. Consequently, the reception rate of data packets at the first node 505 is maximized and number of retransmissions required from the second node 510 is minimized.

The first node 505 transmits one or more data packets to the second node 510 such that the one or more data packets are received by the second node 510 during a radio duty cycle, i.e., during a wake-up period of the second node 510. For example, the radio duty cycle of the second node 510 may be $\frac{1}{8}^{th}$ of a second. Consequently, the data packets are transmitted to the second node 510 successfully in minimal number of transmission attempts, while eliminating the need for retaining the radio transceiver of the second node 510 in continuously ON state for receiving the data packets. Therefore, when the second node 510 is a battery-operated leaf node, the energy consumed during listening and sending of data packets from the leaf node is optimised by using the second RDC protocol. Further, the first node 505 aids the leaf node in optimising the energy consumption by sending the data packets during a wake-up period of the leaf node, thereby minimising loss of data packets.

Figure 6:
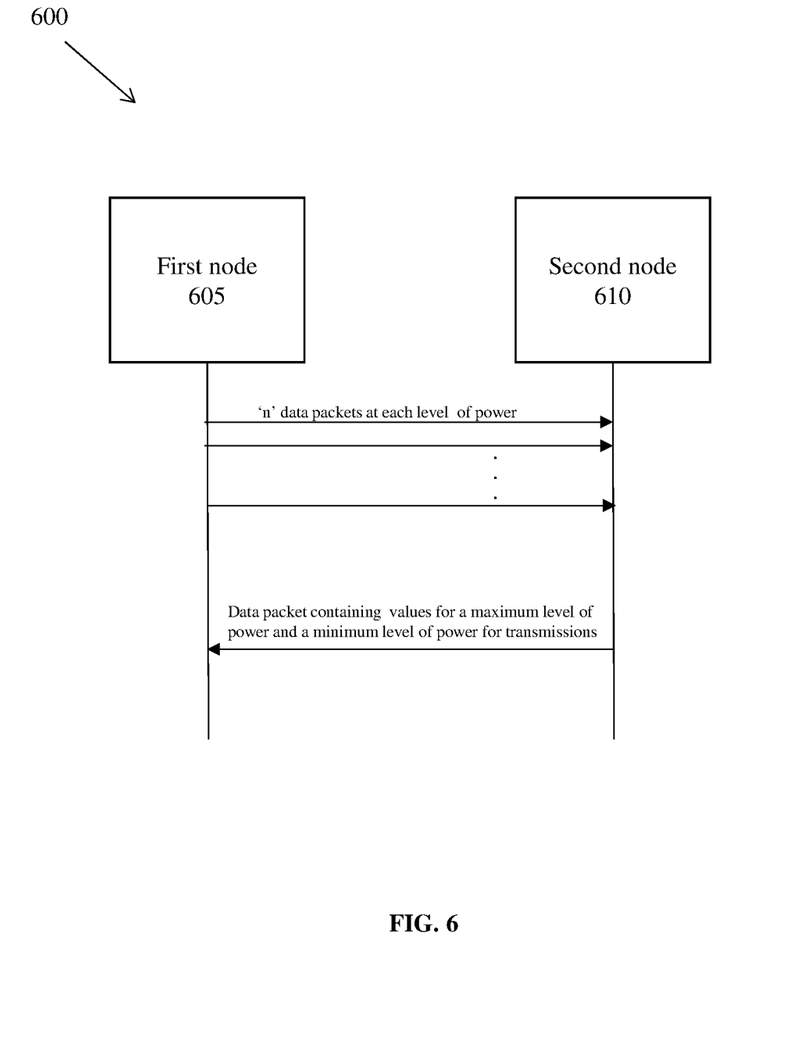
FIG. 6 shows a method for selecting an optimum level of power, by a first node of the Wireless Sensor Network for transmitting data packets to a second node of the Wireless Sensor Network, in accordance with one embodiment of the present disclosure.

Referring to FIG. 6, a method 600 for selecting an optimum level of power, by a first node 605, for transmitting data packets to a second node 610 is described, in accordance with one embodiment of the present disclosure. In one example, the term 'first node' may refer to a branch node, a base station or a router of the WSN 102, and the term 'second node' may refer to a leaf node of the WSN 102. However, it must be understood that the 'first node' and the 'second node' may refer to any two nodes in the WSN 102.

The first node 605 selects the optimum level of power by firstly transmitting a plurality of data packets, say 'n' number of data packets, at each level of power, to the second node 610 during booting phase. For example, the first node 605 may send 'n' data packets at a first level of power, 'n' data packets at a second level of power, 'n' data packets at a third level of power and so on. For each of the data packets received, the second node 610 may transmit a link layer acknowledgement to the first node 605. The data packets at each level of power may be grouped based on sequence numbers of the data packets. Further, the second node 610 calculates a Packet Reception Rate (PRR) corresponding to data packets at each level of power. Based on the values of PRR calculated, the second node 610 determines a suitable maximum level of power and a suitable minimum level of power for transmissions from the first node 605. Further, the second node 610 transmits a data packet containing the values of the maximum level of power and the minimum level of power to the first node 605. Further, the first node 605 uses the values of the maximum level of power and the minimum level of power to calculate an optimum level of power for transmission of data packets to the second node 610. In one implementation, the first node 605 calculates the optimum level of power for transmitting a data packet to the second node 610 based on each of the following: the maximum level of power, the minimum level of power, and based on whether a link layer acknowledgement has been received from the second node 610 for a data packet previously transmitted by the first node 605. Further, the second node 610 may periodically send a data packet containing a PRR for the level of power selected at the first node 605, in order to assure the first node 605 about the level of power selected.

Referring to FIG. 1, the energy consumption during sending of data packets through the WSN 102, by one of a node or a router in the WSN 102, is also optimised using a different level of Quality-of-Service for each data packet transmitted by the node or the router. The level of QoS for each data packet is indicated using a reserved bit in a frame control field within the data packet. That is, the data and the level of QoS for the data are transmitted in a single data packet, thus reducing the energy required for transmission of data packets by the node or the router. In one implementation, the level of QoS to be used for each of the data packets is determined based on a criticality of the data present in the data packet. The level of QoS may be one of 'at the most once', 'once' and 'at least once'.

If the level of QoS is 'at the most once', the data packet is transmitted by a first node to a second node at the most once without awaiting, from the second node, an acknowledgement for receipt of the data packet. In other words, the level of QoS 'at the most once' follows a send-and-forget protocol. The level of QoS 'at the most once' may be used for data of less criticality. For example, room temperature measured by a temperature sensor in the leaf node 115-1 may be considered as data of less criticality. As a result, a radio transceiver of the leaf node 115-1 is switched ON for sending the room temperature to a branch node or base station. After sending, the leaf node 115-1 switches OFF the radio transceiver without awaiting acknowledgement, thereby optimising energy consumption at the leaf node 115-1.

If the level of QoS is 'once', the first node transmits the data packet to the second node and awaits an acknowledgement from the second node. The first node does not however, retransmit the data packet if an acknowledgement is not received from the second node. The level of QoS 'once' may be used for data of medium criticality. For example, data related to diagnostics of the WSN 102 may be considered to have medium criticality.

If the level of QoS is 'at least once', the first node retransmits the data packet, repeatedly, until the second node responds with an acknowledgement for receipt of the data packet. The level of QoS 'at least once' may be used for data of high criticality. For example, data related to control commands may have high criticality. The control commands may be sent by the branch node 110-1 to the leaf node 115-1. If, however, the leaf node 115-1 is in sleep mode, the radio transceiver of the leaf node 115-1 is switched OFF. Consequently, the leaf node 115-1 may not receive the data packets from the branch node 110-1 at all times. Therefore, the branch node 110-1 may repeatedly retransmit the data packet until the leaf node 115-1 acknowledges the receipt of the data packet.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art may appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, including differences in structure, dimension, and use of material, are possible. The scope of embodiments is at least as broad as given by the following claims.

We claim:

1. A wireless sensor network comprising:
one or more base stations;
a plurality of branch nodes communicatively coupled to each of the one or more base stations; and
a plurality of leaf nodes communicatively coupled to each of the branch nodes, wherein the plurality of leaf nodes are battery-operated, and wherein the one or more base stations, the plurality of branch nodes and the plurality of leaf nodes are configured for optimising energy consumption associated with each of the following:
transmitting sensor data from the leaf node to the branch node with a predefined periodicity only when a difference between a present sensor data and an immediate previous transmitted sensor data is greater than a predefined value, wherein the sensor data is at least a value measured by one or more sensors of the leaf node;

encrypting data transmitted between the leaf node and the branch node;

updating firmware of the branch node or of the leaf node, through over-the-air updates from a remote server;

sending data packets through the wireless sensor network based on a plurality of predefined levels of a Quality-of-Service; and configuring radio duty cycle protocols at the base station or the branch node or both during transmission and reception of data packets from the leaf nodes.

2. The wireless sensor network as claimed in claim 1, wherein the one or more base stations, the plurality of branch nodes and the plurality of leaf nodes are configured to have a tree topology.

3. The wireless sensor network as claimed in claim 1, wherein the data transmitted between the leaf node and the branch node are encrypted using a session key, wherein the session key is established for each session, using a pseudo-random number generator, through a three-way handshake protocol.

4. The wireless sensor network as claimed in claim 1, wherein the over-the-air updates are received by the leaf node or the branch node, as data packets, over predefined intervals of time.

5. The wireless sensor network as claimed in claim 1, wherein the level of QoS for a data packet is indicated using a frame control field within the data packet.

6. The wireless sensor network as claimed in claim 1, wherein a first level of QoS consists of at most one transmission of a data packet from a first node of the wireless sensor network to a second node of the wireless sensor network, irrespective of whether the data packet has been received by the second node or not.

7. The wireless sensor network as claimed in claim 6, wherein a second level of Quality of Service consists of transmission of the data packet from the first node to the second node once, and acknowledgement of receipt of the data packet by the second node to the first node.

8. The wireless sensor network as claimed in claim 7, wherein a third level of Quality of Service consists of transmission of the data packet to the second node by the first node, repeatedly, until the first node receives an acknowledgment from the second node.

9. The wireless sensor network as claimed in claim 1, wherein the radio duty cycle protocols of the base station or the branch node or both is configured using one a first radio duty cycling protocol and a second radio duty cycling protocol, wherein one or more of a first radio transceiver of the base station or a second radio transceiver of the branch node or both uses the first radio duty cycling protocol for receiving data from the leaf node, and the second radio duty cycling protocol for sending data to the leaf node.

* * * * *